United States Patent
Zhang

[19]
[11] Patent Number: 6,061,631
[45] Date of Patent: May 9, 2000

[54] HYBRID APPROACH FOR ANTENNA BASELINE SELF-SURVEY AND LINE BIAS CALIBRATION USING GPS CARRIER PHASE

[75] Inventor: Qiyue John Zhang, Sunnyvale, Calif.

[73] Assignee: Trimble Navigation, Ltd., Sunnyvale, Calif.

[21] Appl. No.: 08/887,953

[22] Filed: Jul. 3, 1997

[51] Int. Cl.[7] .................................................. H04B 7/00
[52] U.S. Cl. ........................ 701/213; 701/200; 701/207; 701/215; 342/350; 342/352; 342/450; 342/451; 342/463; 342/357.01; 342/357.04; 342/357.06; 343/757
[58] Field of Search .............................. 701/213–15, 200, 701/207; 342/450, 1, 463, 357.01–357.04, 357.06, 357.17, 451, 352, 350; 343/757

[56] References Cited

U.S. PATENT DOCUMENTS

| | | | |
|---|---|---|---|
| 4,470,145 | 9/1984 | Williams | 375/1 |
| 4,912,475 | 3/1990 | Counselmann, III | 342/352 |
| 5,148,179 | 9/1992 | Allison | 342/357 |
| 5,252,982 | 10/1993 | Frei | 342/357 |
| 5,296,861 | 3/1994 | Knight | 342/357 |
| 5,359,332 | 10/1994 | Allison et al. | 342/357 |
| 5,442,363 | 8/1995 | Remondi | 342/357 |
| 5,451,964 | 9/1995 | Babu | 342/357 |
| 5,519,620 | 5/1996 | Talbot et al. | 364/449 |
| 5,526,291 | 6/1996 | Lennen | 364/571.02 |
| 5,543,804 | 8/1996 | Buchler et al. | 342/357 |
| 5,561,432 | 10/1996 | Knight | 342/357 |
| 5,602,741 | 2/1997 | Talbot et al. | 364/449.7 |

OTHER PUBLICATIONS

Alfred Leick, "GPS Satellite Surveying," 2nd edition, pp. 255–272, John Wiley & Sons, Jan. 1995.

Gang Lu, "Development of a GPS Multi–Antenna System for Attitude Determination," pp. 36–111, Ph.D. Dissertaion, The University of Calgary, Department of Geomatics Engineering, Jan. 1995.

"The Upstreams Protocol for HFC Networks," Mark Laubach (ed.), pp. i–ii, 21–22, and 65–66, Com21, Jun. 23, 1997.

*Primary Examiner*—William A. Cuchlinski, Jr.
*Assistant Examiner*—Yonel Beaulieu
*Attorney, Agent, or Firm*—John Schipper

[57] ABSTRACT

Methods for estimation of the relative locations (baseline vectors) of two or more GPS signal antennas relative to each other and for estimation of line biases associated with each signal processing channel associated with each GPS signal antenna. Double difference carrier phase signal measurements are formed, using floating integer and fixed integer solutions for the phase integer ambiguities, and baseline vectors between the GPS signal antennas are estimated. Single difference phase integer ambiguities are obtained and approximations for line biases are computed. Single difference carrier phase measurements are used to estimate baseline vectors and line biases, using fixed phase integer ambiguities with the estimated baseline vectors and line biases as initial conditions, and are processed by Kalman filtering or other suitable signal processing. Angular orientation or attitude of a vehicle body on which the GPS signal antennas are placed is determined from the baseline vectors.

24 Claims, 4 Drawing Sheets

HYBRID APPROACH FOR ANTENNA BASELINE SELF-SURVEY AND LINE BIAS CALIBRATION USING GPS CARRIER PHASE

FIELD OF THE INVENTION

This invention relates to determination of baseline vectors and line biases of two or more spaced apart antennas using carrier phase signals of a location determination system, such as GPS or GLONASS.

BACKGROUND OF THE INVENTION

A multi-antenna location determination (LD) system, such as the Global Positioning System (GPS) or the Global Orbiting Navigational Satellite System (GLONASS), can be used to determine attitude parameters, such as roll, pitch and yaw, of a vehicle on which antennas are located. For high accuracy measurements, carrier phase GPS signal observables should be used. Carrier phase signals have two associated signals, designated L1 and L2, with associated wavelengths of 19.03 cm and 24.42 cm, respectively. Carrier phase measurements and the problems associated with these measurements are discussed by A. Leick, *GPS Satellite Surveying*, John Wiley & Sons, New York, Second Edition, 1995, pp. 255–272 and 344–392. A phase observable is a difference between the phase of a received satellite carrier signal, as sensed at a receiver's antenna, and the phase of the receiver's internal oscillator. Each such phase observable will have an integer number N of cycles of radian length $2\pi$ plus a fraction f of a cycle, which lies in a range $0 \leq f < 1$. The receiver will measure and report directly only the fractional cycle. Without further analysis, the integer part N of the phase observable becomes ambiguous. Resolving the integer ambiguities associated with carrier phase signals that are simultaneously received from several spaced apart satellites is a central problem in use of carrier phase signals.

Another important issue in use of carrier phase signals is determination or calibration of line biases between two or more antenna signal processing channels. The carrier phase observables needed in a multi-antenna system are the carrier phases at the phase centers of the antennas. However, the phase measurements are taken at the output terminals of phase lock loops on the GPS signal receivers. The signal transmission and processing time delay between the antenna phase centers and the phase measurement points, called line biases, need to be determined and/or eliminated.

Where two or more GPS signal-receiving antennas, having a known baseline or antenna separation vector relative to the vehicle and having known line biases, are located on the vehicle, attitude determination by carrier phase analysis is reasonably straightforward, and any of several approaches may be used. However, where one or both antennas locations are unknown and not easily determinable by standard measuring techniques, the baseline of the antennas must be determined by another approach before carrier phase analysis of the vehicle in a kinematic frame can be performed.

Double difference combinations of location determination signals, such as carrier phase measurements, have been used by some workers to remove certain errors that are common to two or more of the signal components that are part of the double differences. Examples of this work are disclosed in U.S. Pat. No. 4,912,475, issued to Counselman, U.S. Pat. No. 5,148,179, issued to Allison, U.S. Pat. No. 5,252,982, issued to Frei, U.S. Pat. No. 5,359,332, issued to Allison et al, U.S. Pat. No. 5,442,363, issued to Remondi, U.S. Pat. No. 5,451,964, issued to Babu, U.S. Pat. Nos. 5,519,620 and 5,602,741, issued to Talbot et al, U.S. Pat. No. 5,526,291, issued to Lennen, and U.S. Pat. No. 5,543,804, issued to Buchler et al. These patents disclose use of double differences but do not appear to take advantage of the separate advantages in combined use of single difference signals and double difference signals What is needed is a single difference/double difference method, using GPS or GLONASS signals received at each of two receiver antennas from each of two transmitting satellites, for conducting a self-survey and/or a determination of signal transmission and processing line biases. Preferably, this method should not require use of any equipment not already available for GPS signal analysis and should not require use of any special orientations of the vehicle or of the vector separating the antennas.

SUMMARY OF THE INVENTION

These needs are met by the invention, which provides a procedure for self-survey of the locations of, and baseline vector separating, two or more GPS signal-receiving antennas, for a moving or stationary platform. The invention also provides a procedure for line bias calibration at the receiver.

The invention includes five steps, plus subsidiary steps, for analysis of GPS carrier phase signals in one embodiment: (1) estimate baseline vector using double difference carrier phase signals with floating integer ambiguities; (2) determine double difference integer ambiguities and refine estimates of the baseline vectors; (3) refine the solution further using an optimal estimation procedure, such as extended Kalman filtering, to obtain a double difference fixed integer ambiguity solution; (4) form single difference carrier phase observations and obtain a separation of the integer ambiguities and initial values of line biases, using averaging over estimated line biases to improve the accuracy of the fractional parts; (5) use the single difference fixed integer ambiguity solution to accurately estimate baseline vectors, line biases, covariance matrices and the like, again using extended Kalman filter techniques.

After baseline vectors are accurately determined between pairs of GPS signal antennas, relative to the vehicle, the GPS-determined relative locations of the antennas can be used to determine dynamically varying quantities, such as yaw, pitch and/or roll of the vehicle as a function of time.

DESCRIPTION OF BEST MODES OF THE INVENTION

Figure 1A:
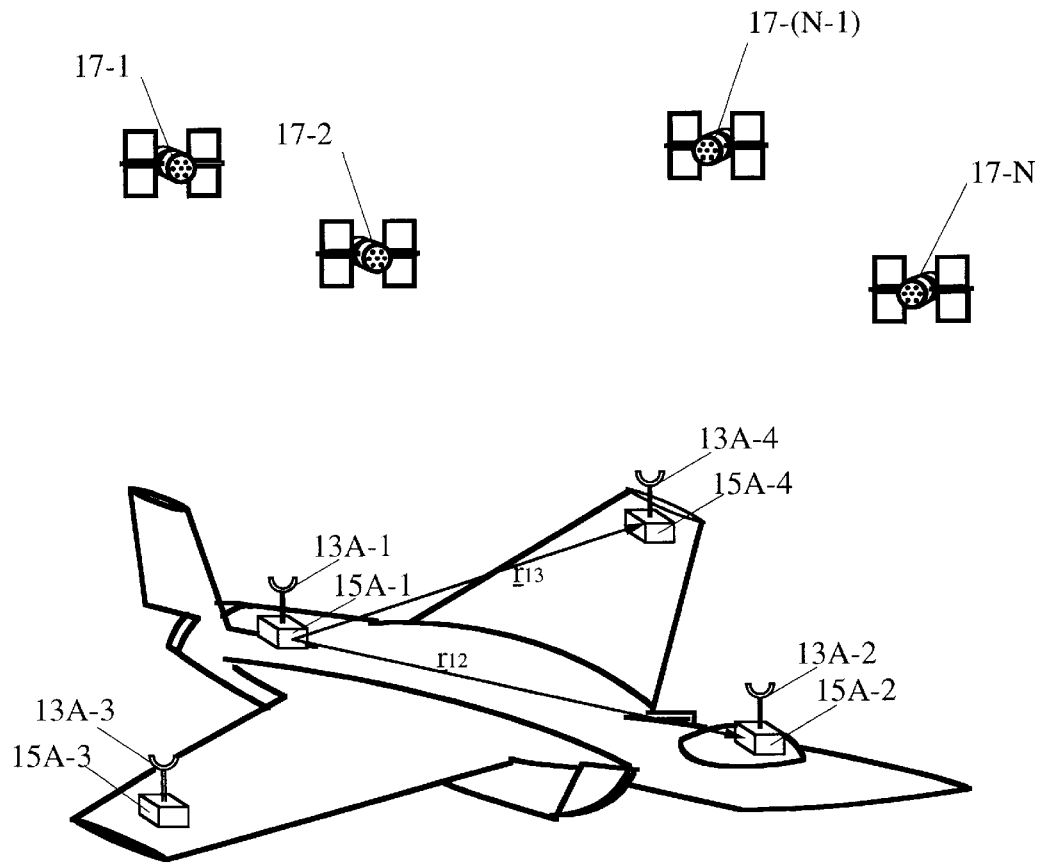
FIG. 1 is a schematic view of an environment in which the invention can be used.

Reference is made in detail to the preferred embodiments of the invention, as illustrated in the accompanying drawings. While the invention is described in conjunction with the preferred embodiments, it is not intended to limit the invention to these embodiments. The description of the invention is intended to cover alternatives, modifications and equivalents, which may be included within the spirit and scope of the invention as defined by the appended claims. In the following detailed description of the invention, many details are set forth to provide a more thorough understanding of the invention. However, it will be obvious to one of ordinary skill in the art that the invention may be practiced without these details. In other instances, methods and procedures well known to one of ordinary skill in the art are not described in detail in order to avoid obscuring relevant aspects of the invention.

Some portions of the detailed description that follows are presented in terms of procedures, logic blocks, processing and other symbolic representations of operations on information bits within a microprocessor. These descriptions and representations are the means used by those skilled in the data processing arts to most effectively convey the substance of their work to other skilled in the art. In the present application, a procedure, logic block, process or other symbolic representation is contemplated to be a self-consistent sequence of steps or instructions leading to a desired result. The steps are those requiring physical manipulations of values representing physical quantities. Often, these values take the form of electrical or magnetic signals that can be stored, transferred, logically combined, compared and otherwise manipulated in a computer system. It is convenient at times to refer to these signals as bits, bytes, elements, symbols, characters, terms, number and the like.

All of these terms and similar terms are to be associated with the corresponding physical quantities and are merely convenient labels associated with the physical quantities. Unless specifically stated otherwise, discussions that utilize terms such as "receiving," "transmitting," "measuring," "estimating," "computing," "performing" and "determining" and the like refer to actions and processes of a computer system or other similar electronic computing device, possibly used together with a device that receives, transmits, electronically filters or otherwise electromagnetically manipulates or transforms signals. The computer system or other similar electronic computing device manipulates and/or transforms information represented as electronic or similar quantities within the computer system's registers and memories into other information that is similarly represented as electronic or other quantities within the computer system registers, memories, information storage, display and transmission devices. The present invention is also suitable for use with other computer systems, such as optical, mechanical and biological computers.

FIG. 1A illustrates an environment in which the invention can be used. A vehicle 11A has two or more carrier phase GPS signal-receiving antennas 13A-1, 13A-2, 13A-3, 13A-4 fixed thereon and receives GPS signals from two or more GPS signal sources 17A, 17B, 17C, 17D. The GPS signals received by each GPS antenna are passed to receiver-processors 15A-1, 15A-2, 15A-3, 15A-4 associated with each respective antenna for processing and analysis of these signals. Optionally, two or more of the receiver-processors 15A-1, 15A-2, 15A-3, 15-A4 can be combined in a single receiver-processor. Each receiver-processor 15A-1, 15A-2, 15A-3, 15A-4 has a plurality of channels, preferably at least four, each of which can lock onto, receive and process GPS signals from a single selected GPS signal source 17A, 17B, 17C, 17D. Optionally, the receiver-processor(s) are located on the vehicle or elsewhere.

The location(s), relative to the vehicle 11A, of one or more of the GPS antennas 13A-1, 13A-2, 13A-3, 13A-4 is assumed to be unknown and is to be determined before the GPS antennas are used to determine the location and/or angular orientation of the vehicle in motion.

As measured at the receiver, a carrier phase observation includes additive effects of: (1) the true range $R^p_m(t)$ between the location of the satellite (p) at the time the carrier phase signal was transmitted and the location of the receiver antenna (m) at the time the carrier phase signal is received; (2) an integer number of cycles $N^p_m(t)$ (ignoring a fractional part f) corresponding to the distance between the satellite at transmission time and the receiver at the time t the signal is received; (3) satellite clock error $\Delta t^p(t)$ at the time the carrier phase signal was transmitted; (4) receiver clock error $\Delta t_m(t)$ at the time the carrier phase signal is received; (5) phase advance $I^p_m(t)$ introduced by propagation of the signal through the ionosphere (relative to propagation of the signal through a vacuum over the same distance); (6) phase retardation or delay $T^p_m(t)$ introduced by propagation of the signal through the troposphere (relative to propagation of the signal through a vacuum over the same distance); (7) time delay $d_m(t)$ introduced in transmitting and processing the carrier phase signal after this signal is received at the receiver antenna (designated as receiver line bias), due to cable lengths, signal processing delays and the like; (8) time delay $d^p(t)$ introduced in processing the carrier phase signal before this signal is transmitted by the satellite (designated as satellite line bias), due to cable lengths, signal processing delays and the like; and (9) a multipath signal contribution and random carrier phase measurement noise $e^p_m(t)$ ("extraneous receiver error") at the receiver. The notation used here is close to that adopted by Leick, op cit. The ionospheric time delay effect depends upon the carrier frequency f used by the satellite. The carrier phase observation $\phi^p_m(t)$ is thus expressible by the relation $$\phi^p_m(t)=R^p_m(t)+\lambda N^p_m(t)+c\Delta t^p(t)-c\Delta t_m(t)-I^p_m(t)+T^p_m(t)+d_m(t)+d^p(t)+e^p_m(t), \quad (1)$$

where c is the velocity of light in a vacuum and $\lambda$ is the carrier wavelength. The phase difference $\phi^p_m(t)=\phi_m(t)-\phi^p(t)$ is usually developed for propagation in a vacuum, and terms, such as $I^p_m(t)$ and $T^p_m(t)$, are added to account for propagation in a medium other than a vacuum.

Where vehicle attitude or angular orientation parameters, such as yaw, pitch and/or roll of a land, waterborne, airborne or spaceborne vehicle, are to be determined, two or more spaced apart antennas are often located on the vehicle, and GPS signals are received and processed from the same group of satellites at each of these antennas. The baseline length between any two of these antennas is necessarily relatively small, usually no more than 100 meters and often as small as 1–2 meters.

Some workers use single difference carrier phase observations, in which carrier phase signals received at each of two spaced apart antennas are subtracted from each other to reduce or eliminate errors and other effects that are common to the phase observations measured at both receivers; these common errors include the satellite line biases $d^p(t)$ and the phase $\phi^p(t)$ at which the transmitted carrier phase signal is received at the receiver. This produces a single difference phase observation defined by the relations $$\phi^p_{m,n}(t)=\phi^p_m(t)-\phi^p_n(t)$$

$$=R^p_{m,n}(t)+\lambda N^p_{m,n}(t)-c\Delta t_{m,n}(t)+d_{m,n}(t)+e^p_{m,n}(t), \quad (2)$$

$$R^p_{m,n}(t)=R^p_m(t)-R^p_n(t), \quad (3)$$

$$N^p_{m,n}(t)=N^p_m(t)-N^p_n(t), \quad (4)$$

$$\Delta t_{m,n}(t)=\Delta t_m(t)-\Delta t_n(t), \quad (5)$$

$$d_{m,n}(t)=d_m(t)-d_n(t), \quad (6)$$

$$e^p_{m,n}(t)=e^p_m(t)-e^p_n(t). \quad (7)$$

The nearly common error due to ionospheric phase advance and the nearly common error due to tropospheric phase delay are dropped in Eq. (2), based on two arguments: (1) these phase advance or delay errors are nearly the same for two adjacent antennas, and thus they cancel when subtracted from each other; and (2) the ionospheric phase advance and tropospheric phase delay can be separately modeled and estimated for each receiver and the common satellite and thus can be separately removed from Eq. (1). The contributions of the terms $I^p_m(t)$, $T^p_m(t)$, $\Delta t^p(t)$ and $d^p(t)$ are thus removed in formation of this single difference carrier phase observation.

Carrier phase analysis based on the single difference carrier phase observation in Eq. (2) requires determination or cancellation of the respective clock errors $\Delta t_m(t)$ and $\Delta t_n(t)$, which can be performed using clock measurements with an atomic clock, such as a Cs or Rb clock, or use of the same clock for both receivers. Determination of the receiver line biases $d_m(t)$ and $d_n(t)$ is not so straightforward, because each of the variables depends upon independent variables such as receiver cable lengths, method(s) of processing the signals received, receiver age, receiver component(s) bias and drift, local temperature and other imponderables.

For this reason, other workers use double difference carrier phase observations, in which a single difference carrier phase observation $\phi^q_{m,n}(t)$ associated with one visible satellite (q) is subtracted from a single difference carrier phase observation $\phi^p_{m,n}(t)$ associated with another visible satellite (p). This produces a double difference phase observation defined by the relation $$\phi^{p,q}_{m,n}(t)=\phi^p_m(t)-\phi^p_n(t)-\{\phi^q_m(t)-\phi^q_n(t)\}$$

$$=R^{p,q}_{m,n}(t)+\lambda N^{p,q}_{m,n}(t)+e^{p,q}_{m,n}(t), \quad (8)$$

$$R^{p,q}_{m,n}(t)=R^p_{m,n}(t)-R^q_{m,n}(t), \quad (9)$$

$$N^{p,q}_{m,n}(t)=N^p_{m,n}(t)-N^q_{m,n}(t), \quad (10)$$

$$e^{p,q}_{m,n}(t)=e^p_{m,n}(t)-e^q_{m,n}(t). \quad (11)$$

In this formation of the double difference carrier phase observation, the receiver clock error contribution $\Delta t_{m,n}(t)$ and the receiver line bias contribution $d_{m,n}(t)$ disappear. The receiver noise error contribution to the extraneous receiver error $e^{p,q}_{m,n}(t)$ for two receivers and for two satellites can be two to four times as large as the receiver noise error for a single receiver. The contribution of multipath signal error to the extraneous receiver error term $e^{p,q}_{m,n}(t)$ can be larger or smaller than the multipath error contributions for the individual satellite-receiver communications. The result is usually increased inaccuracy, relative to the single difference carrier phase observations defined in Eq. (2).

Three methods for determining the antenna baseline vector $r_{12}$ separating the two receiver antennas are available here. In a fixed integer solution approach, used primarily in the double difference format, the phase integer contributions $N^{p,q}_{m,n}(t)$ are estimated as integers initially, and these numbers are not changed subsequently. This approach is less accurate than the single difference approach, because the double difference noise contributions $e^{p,q}_{m,n}(t)$ are usually larger than the single difference noise contributions $e^p_{m,n}(t)$. If the contributions $N^{p,q}_{m,n}(t)$ have been carefully estimated and fixed to the correct integers, the fixed integer approach is more accurate than a floating integer approach (described in the following), because the fixed integer quantity $N^{p,q}_{m,n}$ is always an integer in the fixed integer approach. However, it may occur that the phase integer contributions are inaccurate initially, and these initial inaccuracies may produce much worse inaccuracies at a later time, as the satellite locations change relative to each other; the standard deviations associated with such errors are relatively large.

In a floating integer approach, useful for double differences, the phase integer contributions $N^{p,q}_{m,n}(t)$ are re-estimated as rational numbers from time to time, for example, in each data sampling time interval of selected length 1–20 seconds. These re-estimations of $N^{p,q}_{m,n}(t)$ result in some "jitter" in these numbers, with moderate size inaccuracies, because of correlations among baseline vectors and the floating integers. However, the inaccuracies in the numbers $N^{p,q}_{m,n}(t)$ are constrained to some degree, because these numbers are continually re-estimated. One disadvantage here is that re-computation of the phase integer contributions $N^{p,q}_{m,n}(t)$ is required at certain times during the survey or mapping activity. This approach requires greater solution convergence times and has lower associated accuracy than the fixed integer ambiguity approach, if the ambiguities are fixed to the correct numbers.

In a single difference floating integer approach, the sum of the phase integer contribution and the receiver line bias contribution, $N^p_{m,n}(t)+d_{m,n}(t)$, is determined as a unitary item, and the receiver clock error contribution $\Delta t_{m,n}(t)$ is determined from other measurements, or is canceled if the same clock is used for both receivers. This approach requires more computation, because the sums $N^p_{m,n}(t)+d_{m,n}(t)$ for each carrier phase observation are unknown parameters and need to be estimated together with baseline vector parameters. This approach often requires a long time for filter convergence and is used for stationary platforms.

Figure 2:
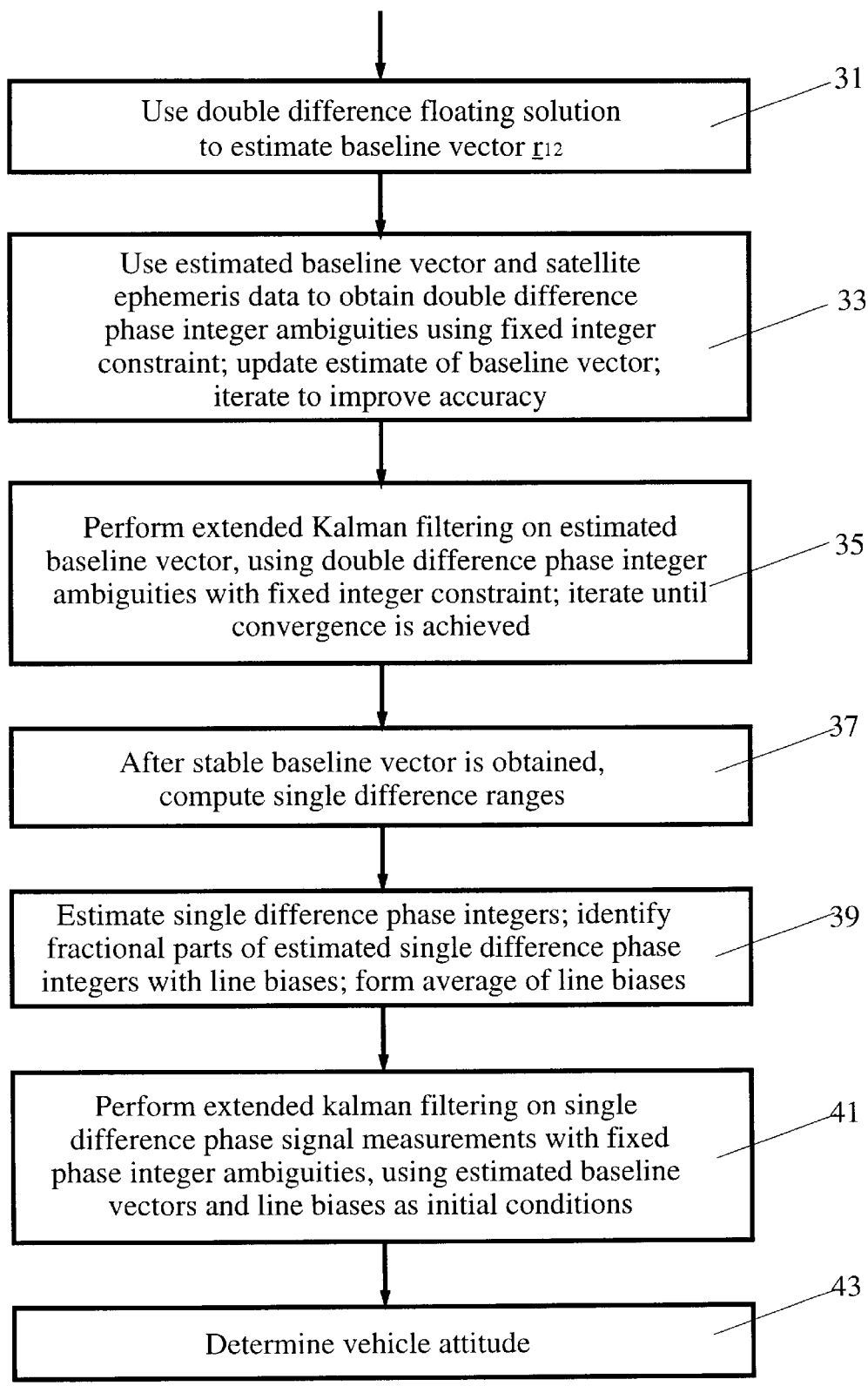
FIG. 2 is a flow chart of steps in a suitable procedure according to one embodiment of the invention.

FIG. 2 illustrates, in flow chart form, a suitable procedure according to the invention. In a first step 31, a double difference, floating solution format is adopted to determine the range contributions $R^{p,q}_{m,n}(t)$ to the carrier phase signals $\phi^{p,q}_{m,n}(t)$ This allows estimation of the baseline or antenna separation vector $r_{12}$ to an inaccuracy of no worse than 0.5 cycle of carrier phase. A full carrier phase integer ambiguity search is not required here, which reduces the amount of computation required. Pseudorange observations are used, if desired, to estimate the quantities $R^{p,q}_{m,n}(t)$ and to provide faster convergence of the estimation. GPS Doppler observations may be used to increase the accuracy of user velocity determinations in a dynamic environment.

A discrete system in a dynamic mode is described by a sequence of equations $$x_{k+1}=\phi_k x_k+w_k (k=1,2,\ldots) \quad (12)$$

where $x_k$ is a system state vector, $\phi_k$ is a transition matrix for the system state vector and $w_k$ is a system noise vector. In a measurement mode, the discrete system is described by a sequence of equations $$z_k=H_k x_k+v_k (k=1,2,\ldots) \quad (13)$$

where $z_k$ is a measurement vector, $H_k$ is an observation matrix and $v_k$ is a measurement noise vector.

In the first step 31, the state vector $x_k$ may consist of or include $e_k$ (east component of the baseline vector), $n_k$ (north component of the base line vector), $u_k$ (upward or vertical component of the baseline vector), first order time derivatives $de_k/dt$, $dn_k/dt$, $du_k/dt$ of these components, and floating double difference phase integer ambiguities $N^p_k$ (p=1, 2, ..., J). Here J is the total number of double difference carrier phase measurements made at a sampling time $t=t_k$.

The first order time derivatives are modeled as first order Gauss-Markov processes, using relations such as $$dn_{k+1}/dt = \exp(-\beta_k \Delta t_k)(dn_k/dt) + w_k, \quad (14)$$

where $\Delta t_k$ is a sampling time interval length and $(\beta_k)^{-1}$ is a correlation time. Here, any of three kinds of measurements may be used to update the state vector $x_k$: pseudorange observations, carrier phase observations and Doppler shift observations. The form of the measurement matrix $H_k$ used depends upon the type of measurements used.

In a second step 33, the baseline vector $r_{12}$ estimated in the first step is used, together with satellite ephemeris data, to determine ranges of double difference variables between satellites and receiver antennas, then applying the following fixed integer constraint: If a phase integer ambiguity is within a selected fraction, such as ±0.3, of an integer, the floating phase integer variable is replaced by that nearest integer. With this criterion adopted, for example, any number between 41.7 and 42.3 would be reassigned to the "constrained" integer 42. The baseline vector $r_{12}$ is then updated or recomputed, using the constrained integer values computed as in this second step. The updated baseline vector $r_{12}$ is then used to determine any phase integer ambiguities not yet fixed by the preceding computations. The process in step 33 may be iterated upon once or many times to improve the accuracy of the baseline vector $r_{12}$ and of the phase integer ambiguities. Any phase integer ambiguities that remain are kept in the floating format.

In the second step 33, a double difference range for satellite number p and receiver number m is computed from the equation $$P_{d,m,n}^{p,q} = (u^p_m - u^q_m) \cdot r_{12}, \quad (15)$$

where $u^p_m$ and $u^r_m$ are unit length line-of-sight vectors from GPS receiver antenna number m to satellite number p and to a reference satellite number q, respectively, and $r_{12}$ is a baseline vector. A phase integer ambiguity for satellite numbers p and q and receivers number m and n is computed using the equation $$N_{d,m,n}^{p,q} = [\theta_{d,m,n}^{p,q} - P_{d,m,n}^{p,q}]_{nint}, \quad (16)$$

where $\theta_{d,m,n}^{p,q}$ is the double difference carrier phase measurement for satellite numbers p and q and receivers number m and n and $[w]_{nint}$ represents the integer nearest to the real number w; for example, $[3.8]_{nint} = 4$ and $[-5.1]_{nint} = -5$.

In a third step 35, extended Kalman filtering or another optimal estimation procedure is used to improve the accuracy of an estimated baseline vector $r_{12}$, using carrier phase measurements with double difference fixed phase integer ambiguities as input signals to redetermine the remote or slave antenna coordinates and the antenna's velocity vector. This step may continue for several minutes, until the solution converges to a stable, optimal estimation of the baseline vector. During this step, as each "new" satellite becomes visible, its associated phase integer ambiguities are determined, using the procedure of step 33.

In the third step 35, the state vector $x_k$ includes the east, north and upward components $e_k$, $n_k$ or $u_k$ of the baseline vector and the first order time derivatives thereof. The phase integer ambiguities are known parameters. The observations are double difference carrier phase values (preferred), double difference pseudorange values (if available) and/or double difference Doppler shift values (if available).

After a stable optimal estimate of the baseline vector $r_{12}$ is obtained, single difference ranges between the receiver antennas are computed, using the enhanced accuracy coordinates of the baseline vector $r_{12}$ and the line of sight from each receiver antenna (m) to each satellite (p). In the fourth step 37, single difference ranges between satellite number p and receiver number m are computed using the equations $$P_{s,m}^p = u^p_m \cdot r_{12}, \quad (17)$$

where $u^p_m$ is the line-of-sight unit length vector from receiver number m to satellite number p.

In a fifth step 39, differences between computed single difference ranges and single difference phase measurements are computed. The integer parts of these differences are used to fix the phase integer ambiguities. Averages of the fractional parts of these differences are formed and interpreted as initial values of the line biases associated with signal processing channels for the receiver.

In the fifth step 39, a single difference phase integer ambiguity for satellite number p and receiver number m is computed using the equation $$N_{s,m}^p = [\theta_{s,m}^p - P_{s,m}^p]_{int}, \quad (18)$$

where $\theta_{s,m}^p$ is the single difference carrier phase measurement for satellite number p and receiver number m and $[w]_{int}$ represents the integer part of the real number w. The operations $[w]_{nint}$ and $[w]_{int}$ are related by the equation $$[w]_{nint} = [w+0.5]_{int}. \quad (19)$$

Other equations used in the fifth step include computation of the fractional part of the phase integer ambiguity associated with a receiver channel number m $$l^p_m = (\theta_{s,m}^p - P_{s,m}^p) - N_{s,m}^p$$
$$= (\theta_{s,m}^p - P_{s,m}^p) - [\theta_{s,m}^p - P_{s,m}^p]_{int}, \quad (20)$$

and computation of the average of these fractional parts over M satellite tracking channels $$l_{m,avg} = \sum_{p=1}^{M} l^p_m / M. \quad (21)$$

The fractional part $l^p_m$ is associated with an approximate line bias for receiver number m and is computed using carrier phase signals from satellite number p.

In a sixth step 41, the baseline vector $r_{12}$, receiver line biases, fixed single difference phase integer ambiguities and computed covariance matrices for the baseline vector estimations are used as initial conditions for an extended Kalman filtering or other optimal estimation procedure, to continue to measure single difference phase signals and to estimate the baseline vector $r_{12}$ and receiver line biases. The contributions of the noise terms $e^p_{m,n}(t)$ are lower in the single difference format than in the double difference format so that the baseline vector and other variables obtained in the sixth step are more accurate than the corresponding values obtained in the third step. In the sixth step 41, receiver line biases are estimated accurately because the single difference integer ambiguities are fixed in step 39. In the sixth step, an extended Kalman filter is used to track the state vector $x_k = (e_k, n_k, u_k, de_k/dt, dn_k/dt, du_k/dt, l_{m,avg})$, where the line bias average $l_{m,avg}$ may depend upon the characteristics of the receiver antenna(s) and upon local temperature and other weather variables.

In a seventh step 43 (optional), the computed baseline vector(s) and line biases and the carrier phase signals at each of the antennas are used to determine the present attitude or angular orientation of the vehicle 11 to which the antennas are attached. In the seventh step 43, present attitude of the vehicle is determined by any of several methods that are discussed in Gang Lu, "Development of a GPS Multi-antenna System for Attitude Determination," Ph.D. dissertation submitted to the Department of Geomatics Engineering, University of Calgary, Calgary, Alberta, Canada, January 1995, pp. 36–109.

Figure 1B:
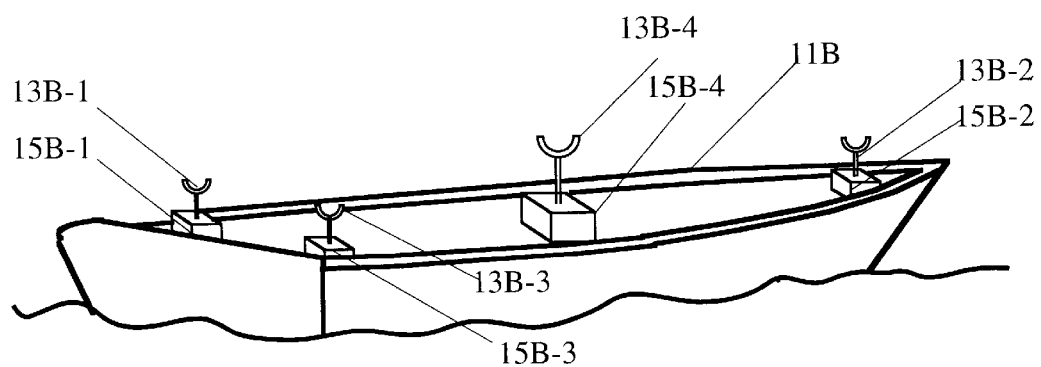
Figure 3:
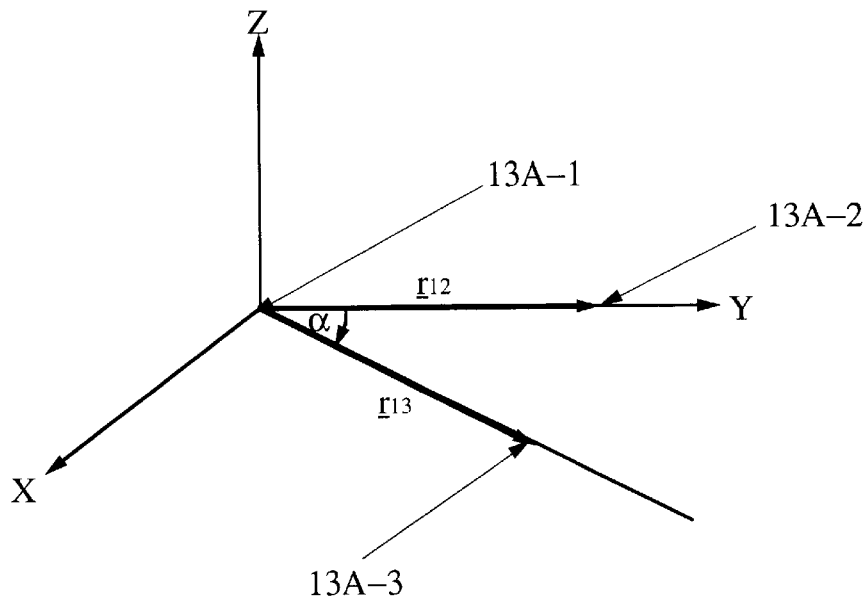
FIG. 3 illustrates a vehicle body frame coordinate system.

One example of attitude determination is a direct computation method. A vehicle body frame is defined so that its origin is at the phase center of the master antenna (for example, 13A-1 or 13B-1 in FIG. 1A or 1B, respectively). As illustrated in FIG. 3 the antennas 13A-1, 13A-2 and 13A-3 define an xy-plane Π of the body frame, with the y-axis oriented along a baseline vector $r_{12}$ from the antenna 13A-1 to 13A-2. The x-axis lies in the xy-plane, is perpendicular to the y-axis, and points toward the side of the baseline vector $r_{13}$ on which the antenna 13A-3 lies. A z-axis of the three-dimensional right-handed coordinate system (x,y,z) is then perpendicular to the xy-plane Π. Baseline lengths $L_{12}=|r_{12}|$ and $L_{13}=|r_{13}|$ are then determined in a self-survey. The baseline vectors in the vehicle body frame then become $$r_{12}{}^b=(0,L_{12},0)^{tr}, \qquad (22)$$

$$r_{13}{}^b=(L_{13}\sin\alpha, L_{13}\cos\alpha, 0)^{tr}, \qquad (23)$$

where $\alpha$ is the angle between the baseline vectors $r_{12}{}^b$ and $r_{13}{}^b$.

The baseline vector coordinates in a local level frame are determined by GPS differential carrier phase measurements and are expressed by the relations $$r_{12}{}^L=(x_2,y_2,z_2), \qquad (24)$$

$$r_{13}{}^L=(x_3,y_3,z_3). \qquad (25)$$

A transformation matrix T(y,r,p), which depends upon yaw (y), roll (r) and pitch (p) of the vehicle, can be used to transform the baseline vectors from the local level frame to the vehicle body frame, using the relations $$r_{1i}{}^b=T(y,r,p)\cdot r_{1i}{}^L \, (i=2,3), \qquad (26)$$

$$T(y,r,p) = \begin{bmatrix} (-\sin r\, \sin p\, \sin y + \cos r\, \cos y) & (\sin r\, \sin p\, \cos y + \cos r\, \sin y) & -\sin r\, \cos p \\ -\cos p\, \sin y & \cos p\, \cos y & \sin p \\ (\cos r\, \sin p\, \sin y + \sin r\, \cos y) & (-\cos r\, \sin p\, \cos y + \sin r\, \sin y) & \cos r\, \cos p \end{bmatrix} \qquad (27)$$

Vehicle attitude parameters for yaw, pitch and roll are determined using Eqs. (22)–(27) and are expressed as $$y=-\tan^{-1}(x_2/y_2), \qquad (28)$$

$$p=\tan_{-1}(z_2/[(x_2)^2+(y_2)^2]^{1/2}), \qquad (29)$$

$$r=\tan^{-1}(Z/X), \qquad (30)$$

where the coordinates X and Z are computed using the relations $$X=x_3 \cos y + y_3 \sin y, \qquad (31)$$

$$Z=x_3 \sin p \sin y - y_3 \sin p \cos y + z_3 \cos p. \qquad (32)$$

Another approach for attitude determination is an implicit least squares method, developed by Gang Lu, op cit, pp. 57–60. This method requires more computation than the direct computation method but provides more accurate results.

Figure 4:
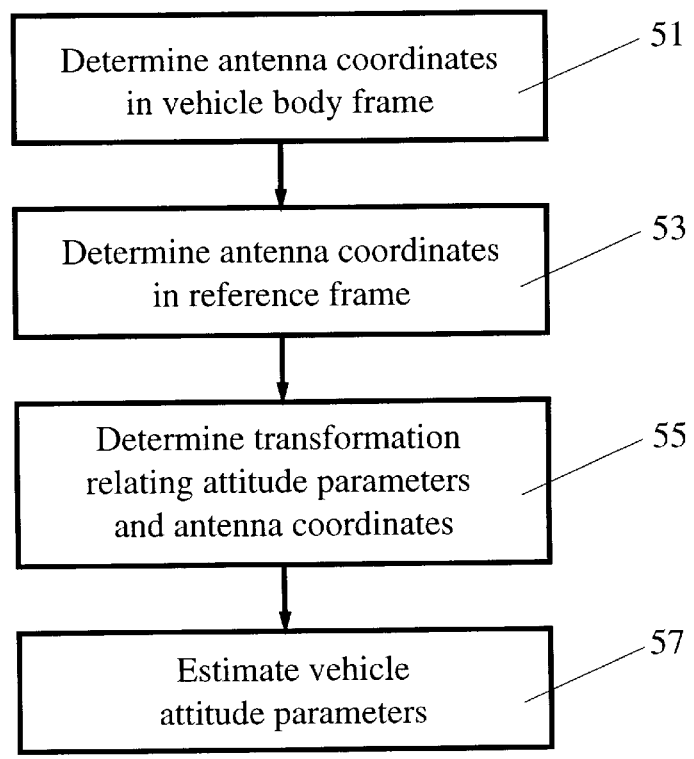
FIG. 4 is a flow chart of steps useful in attitude determination.

FIG. 4 is a flow chart illustrating a suitable procedure to determine angular orientation of a vehicle when three or more non-collinear antennas are present. In step 51, antenna locations are expressed in vehicle body frame coordinates, as determined by a self-survey algorithm or by another suitable method, such as a conventional survey using optical or electrical equipment. Equations (22) and (23) can be used here. In step 53, antenna coordinates in a reference frame, for example, a local level frame, are determined by using GPS carrier phase measurements. These two sets of antenna coordinates are related to each other by a transformation matrix, such as T(y,r,p) in Eqs. (26) and (27). This transformation relation is manipulated in step 55, using rotations, linearization and/or parameter updating in an implicit least squares approach. In step 57, attitude parameters, such as yaw, pitch and roll, are determined, either by direct computation or by optimal estimation, such as an implicit least squares approach.

Figure 5:
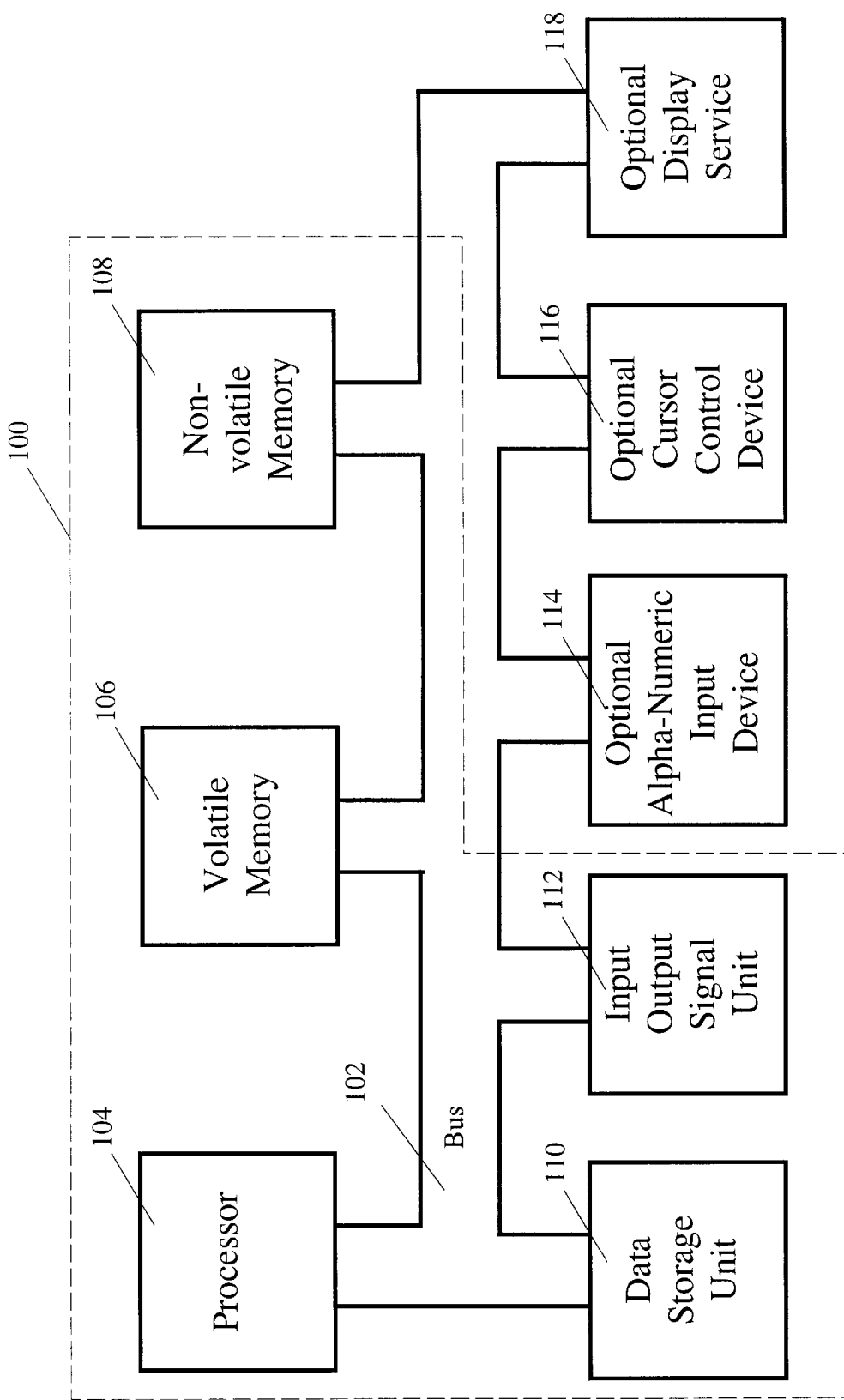
FIG. 5 is a schematic view of computer apparatus useful in practicing the invention.

Portions of the hybrid method of the invention include computer-readable and computer-executable instructions that reside, for example, in computer-usable media of a computer system. FIG. 5 illustrates an exemplary computer system 100 used to perform the hybrid method in accordance with an embodiment of the present invention. The system 100 in FIG. 5 is exemplary only; the present invention can operate within a number of different computer systems including general purpose computers systems, embedded computer systems, and stand alone layout editors or automated pattern generator computer systems specially adapted for the hybrid method.

The system 100 of FIG. 5 includes an address/data bus 102 for communicating information, and a central processor unit or CPU 104 coupled to the bus for processing information and instructions. The system 100 also incudes data storage apparati, such as a computer-usable volatile memory 106 (e.g., random access memory or RAM), coupled to the bus 102 for storing information and instructions for the CPU 104, a computer-usable non-volatile memory 108 (e.g., read only memory or ROM), coupled to the bus for storing static information and instructions for the CPU, and a data storage device 110 (e.g., a magnetic or optical disk and disk drive), coupled to the bus for storing information and instructions. A signal input/output communications device 112 (e.g., a modem, serial port or parallel port) coupled to the bus 102 is optionally included in the system 100 in FIG. 5.

The system 100 of the present invention optionally includes an alphanumeric input device 114, including alpha-numeric keys and function keys, coupled to the bus 102 for communicating information and command selections to the CPU 104. The system 100 optionally includes a cursor control device 116 coupled to the bus 102 for communicating user input information and command selections to the CPU 104. The system 100 of the present embodiment optionally includes a display device 118 coupled to the bus 102 for displaying information.

The display device 118 in FIG. 5 may be a liquid crystal device, cathode ray tube, or other display device suitable for creating graphic images and alphanumeric characters recognizable to a user. The cursor control device 116 allows the computer user to dynamically represent two-dimensional movement of a visible symbol (cursor) on a display screen of the display device 118. Many implementations of the cursor control device 116 are known in the art, including a trackball, mouse, touch pad, joystick or special keys on the alphanumeric input device 114 capable of representing movement of a given direction or manner of displacement. Alternatively, a cursor can be directed and/or activated via input from the alphanumeric input device 114, using special keys and/or key sequence commands. The present invention is also suitable for directing a cursor by other means such as, for example, voice commands.

The procedure disclosed here uses double difference analysis to accurately determine phase integer ambiguities, uses single difference analysis to estimate the line bias(es) for the signal processing channel(s), and thereby provides a more accurate estimate of carrier phase parameters and vehicle attitude in a kinematic or static environment.

I claim:

1. A method for determination of the locations of, and line biases for, two or more spaced apart GPS signal antennas in a kinematic or static environment, the method comprising the steps of:

receiving GPS carrier phase signals from at least two GPS signal sources at each of at least two GPS signal antennas and associated GPS signal receivers;

measuring double difference phase signal observations for the carrier phase signals received at the at least two GPS receivers from at least two GPS signal sources and determining fixed value double difference phase integer ambiguities;

computing a single difference range for each of the at least two GPS signal sources and determining single difference phase measurements for the at least two GPS signal sources; and subtracting the computed single difference range from the single difference phase measurement, identifying the integer part of this difference with a single difference phase integer ambiguity, and identifying the fractional part of this difference with a line bias for a signal processing channel associated with each of the at least two GPS receivers.

2. The method of claim 1, wherein said step of determining fixed value double difference phase integer ambiguities comprises the steps of:

estimating a first value of a baseline vector for a vector separating said at least two GPS receivers, using double difference floating phase integer solutions; and estimating a second value of the baseline vector, using the first estimated baseline vector, ephemeris data for said at least two GPS signal sources and double difference fixed phase integer solutions.

3. The method of claim 1, further comprising the step of performing extended Kalman filtering on said single difference carrier phase observations with said fixed phase integer ambiguities to obtain a third value of said estimated baseline vector and to determine said line biases, using said estimated second baseline vector and said line biases as initial conditions.

4. The method of claim 3, further comprising the step of using said Kalman filtered single difference carrier phase observations, said line biases and said third value of said estimated baseline vector to estimate an attitude or angular orientation of said at least two GPS antennas relative to each other.

5. The method of claim 4, further comprising the step of using said Kalman filtered single difference carrier phase observations and said third value of said estimated baseline vector to estimate an attitude or angular orientation of said at least three GPS antennas relative to each other.

6. The method of claim 1, further comprising the steps of:

positioning said at least three GPS antennas on a selected vehicle; and estimating an angular orientation of said at least three GPS antennas relative to a selected body frame of the vehicle.

7. The method of claim 6, further comprising the step of estimating an angular orientation of said vehicle body frame.

8. A method for determination of the locations of, and line biases for, two or more spaced apart GPS signal antennas, the method comprising the steps of:

receiving GPS carrier phase signals from at least two GPS signal sources at each of at least two GPS signal antennas and associated GPS signal receivers;

measuring double difference phase signal observations for the carrier phase signals received at the at least two GPS receivers from at least two GPS signal sources;

estimating a first value of a baseline vector for the vector separating the at least two GPS receivers, using double difference floating phase integer solutions;

determining double difference phase integer ambiguities, using fixed integer constraints, the estimated first baseline vector and ephemeris data for each of the at least two GPS signal sources;

estimating a second value of the baseline vector, using the double difference phase measurements with fixed integer phase solutions;

computing a single difference range for each of the at least two GPS signal sources and determining single difference phase measurements for the at least two GPS signal sources;

subtracting the computed single difference range from the single difference phase measurement, identifying the integer part of this difference with a single difference integer ambiguity, and identifying the fractional part of this difference with a line bias for a signal processing channel associated with each of the at least two GPS receivers; and performing extended Kalman filtering on single difference phase signal observations with fixed phase integer ambiguities to obtain a third value of the estimated baseline vector and to determine line biases, using the initial values of line biases and estimated second value of the baseline vector as initial conditions.

9. The method of claim 8, further comprising the step of using said Kalman filtered single difference carrier phase observations, said line biases and said third value of said estimated baseline vector to estimate an attitude or angular orientation of said at least two GPS antennas relative to each other.

10. The method of claim 8, further comprising the step of using said Kalman filtered single difference carrier phase observations, said line biases and said third value of said estimated baseline vector to estimate an attitude or angular orientation of said at least three GPS antennas relative to each other.

11. The method of claim 10, further comprising the steps of:
   positioning said at least three GPS antennas on a selected vehicle; and
   estimating an angular orientation of said at least three GPS antennas relative to a selected body frame of the vehicle.

12. The method of claim 11, further comprising the step of estimating an angular orientation of said vehicle body frame.

13. A computer-usable medium having computer-readable program code embedded therein for causing a computer to determine the locations of, and line biases for, two or more spaced apart GPS signal antennas by performing the steps of:
   receiving GPS carrier phase signals from at least two GPS signal sources at each of at least two GPS signal antennas and associated GPS signal receivers;
   measuring double difference phase signal observations for the carrier phase signals received at the at least two GPS receivers from at least two GPS GPS signal sources;
   estimating a first value of a baseline vector for the vector separating the at least two GPS receivers, using double difference floating phase integer solutions;
   estimating a second value of the baseline vector, using the first estimated baseline vector, ephemeris data for the at least two GPS signal sources and double difference fixed phase integer solutions;
   computing a single difference range for each of the at least two GPS signal sources and determining single difference phase measurements for the at least two GPS signal sources; and
   subtracting the computed single difference range from the single difference phase measurement, identifying the integer part of this difference with a single difference integer ambiguity, and identifying the fractional part of this difference with a line bias for a signal processing channel associated with each of the at least two GPS receivers.

14. The computer-usable medium of claim 13, wherein said computer-readable program code further causes said computer to perform extended Kalman filtering on said single difference carrier phase observations with said fixed phase integer ambiguities to obtain a third value of said estimated baseline vector and to determine said line biases, using said estimated second baseline vector and said line biases as initial conditions.

15. The computer-usable medium of claim 14, wherein said computer-readable program code further causes said computer to use said Kalman filtered single difference carrier phase observations, said line biases and said third value of said estimated baseline vector to estimate an attitude or angular orientation of said at least two GPS antennas relative to each other.

16. The computer-usable medium of claim 14, wherein said computer-readable program code further causes said computer to use said Kalman filtered single difference carrier phase observations, said line biases and said third value of said estimated baseline vector to estimate an attitude or angular orientation of said at least three GPS antennas relative to each other.

17. The computer-usable medium of claim 16, wherein said at least three GPS antennas are positioned on a selected vehicle; and
   wherein said computer-readable program causes said computer to estimate an angular orientation of said at least three GPS antennas relative to a selected body frame of the vehicle.

18. The computer-usable medium of claim 14, wherein said computer-readable program code further causes said computer to estimate an angular orientation of said vehicle body frame.

19. A computer system comprising:
   a computer signal processor;
   an address and data bus connected the processor;
   a computer-readable memory, connected to the processor, that provides processor instructions that allow the processor to perform the steps of:
      receiving GPS carrier phase signals from at least two GPS signal sources at each of at least two GPS signal antennas and associated GPS signal receivers;
      measuring double difference phase signal observations for the carrier phase signals received at the at least two GPS receivers from the at least two GPS GPS signal sources;
      estimating a first value of a baseline vector for the vector separating the at least two GPS receivers, using double difference floating phase integer solutions;
      estimating a second value of the baseline vector, using the first estimated baseline vector, ephemeris data for the at least two GPS signal sources and double difference fixed phase integer solutions;
      computing a single difference range for each of the at least two GPS signal sources and determining single difference phase measurements for the at least two GPS signal sources; and
   subtracting the computed single difference range from the single difference phase measurement, identifying the integer part of this difference with a single difference integer ambiguity, and identifying the fractional part of this difference with a line bias for a signal processing channel associated with each of the at least two GPS receivers.

20. The computer system of claim 19, wherein said processor further performs extended Kalman filtering on said single difference carrier phase observations with said fixed phase integer ambiguities to obtain a third value of said estimated baseline vector and to determine said line biases, using said estimated second baseline vector and said line biases as initial conditions.

21. The computer system of claim 20, wherein said processor further uses said Kalman filtered single difference carrier phase observations, said line biases and said third value of said estimated baseline vector to estimate an attitude or angular orientation of said at least two GPS antennas relative to each other.

22. The computer system of claim 20, wherein said processor further uses said Kalman filtered single difference carrier phase observations, said line biases and said third value of said estimated baseline vector to estimate an attitude or angular orientation of said at least three GPS antennas relative to each other.

23. The computer system of claim 22, wherein said at least three GPS antennas are positioned on a selected vehicle; and
   wherein said processor estimates an angular orientation of said at least three GPS antennas relative to a selected body frame of the vehicle.

24. The computer system of claim 23, wherein said processor estimates an angular orientation of said vehicle body frame.

* * * * *